United States Patent [19]

Sugiyama

[11] Patent Number: 5,396,493
[45] Date of Patent: Mar. 7, 1995

[54] LOCAL AREA NETWORK BRIDGE APPARATUS WITH DEDICATED PACKET FILTERING MECHANISM

[75] Inventor: Takashi Sugiyama, Tokyo, Japan

[73] Assignee: Kabushiki Kaisha Toshiba, Kawasaki, Japan

[21] Appl. No.: 113,905

[22] Filed: Aug. 31, 1993

[30] Foreign Application Priority Data

Aug. 31, 1992 [JP] Japan ................................. 4-230764

[51] Int. Cl.$^6$ ........................ H04J 3/26; H04L 12/46; H04L 12/56
[52] U.S. Cl. .................................. 370/60; 370/85.13; 370/94.1
[58] Field of Search ............... 370/17.60, 85.12, 85.13, 370/85.14, 85.15, 94.1; 340/825.05, 825.52

[56] References Cited

U.S. PATENT DOCUMENTS

| | | | |
|---|---|---|---|
| 4,922,503 | 5/1990 | Leone | 370/85.13 |
| 5,050,165 | 9/1991 | Yoshioka et al. | 370/85.13 |
| 5,060,228 | 10/1991 | Tsutsui et al. | 370/85.13 |
| 5,095,480 | 3/1992 | Fenner | 370/94.1 |
| 5,136,580 | 8/1992 | Videlock et al. | 370/85.13 X |
| 5,151,897 | 9/1992 | Suzuki | 370/85.14 X |
| 5,224,096 | 6/1993 | Onishi et al. | 370/85.14 X |

FOREIGN PATENT DOCUMENTS

| | | |
|---|---|---|
| 3-270532 | 3/1990 | Japan . |
| 4-21232 | 5/1990 | Japan . |
| 3-5322 | 1/1992 | Japan . |

*Primary Examiner*—Melvin Marcelo
*Attorney, Agent, or Firm*—Oblon, Spivak, McClelland, Maier, & Neustadt

[57] ABSTRACT

A local area network (LAN) bridge apparatus capable of carrying out the address learning and the packet filtering at a high speed, without requiring the program execution on the micro-processor for these purposes. The apparatus provides, besides the usual micro-processor and LAN controller, a dedicated mechanism including: a filtering address table (FAT) memory for registering FAT data containing a filtering address (FA); a FAT memory address generator for generating FAT memory addresses for specifying the FAT data in the FAT memory by compressing a sender address (SA) and a destination address (DA) of each packet transmitted from the LAN; an address learning circuit for obtaining the SA of each packet and registering the FAT data with the obtained SA as the FA in the FAT memory specified by the FAT memory address generated by the FAT memory address generator from the SA of each packet; a DA obtaining circuit for obtaining a DA from each packet; and a judging circuit for judging each packet as a packet to be discarded when the FA of the FAT data registered in the FAT memory specified by the FAT memory address generated by the FAT memory address generator from the DA of each packet coincides with the DA obtained by the DA obtaining circuit from each packet.

19 Claims, 3 Drawing Sheets

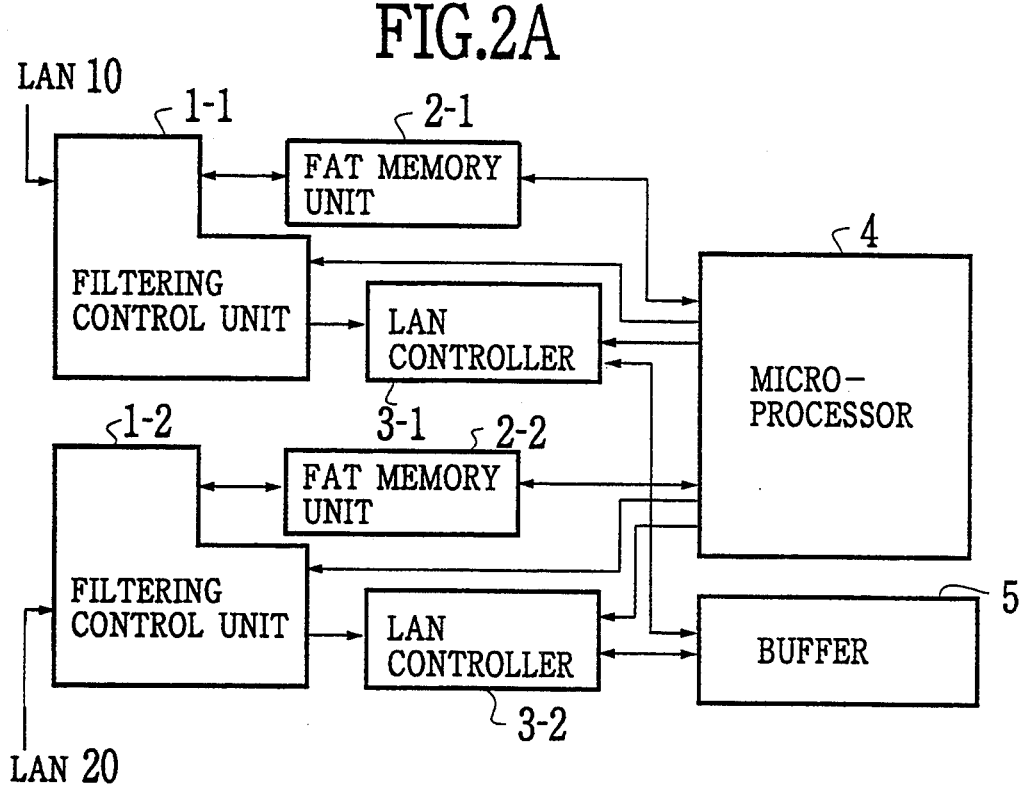
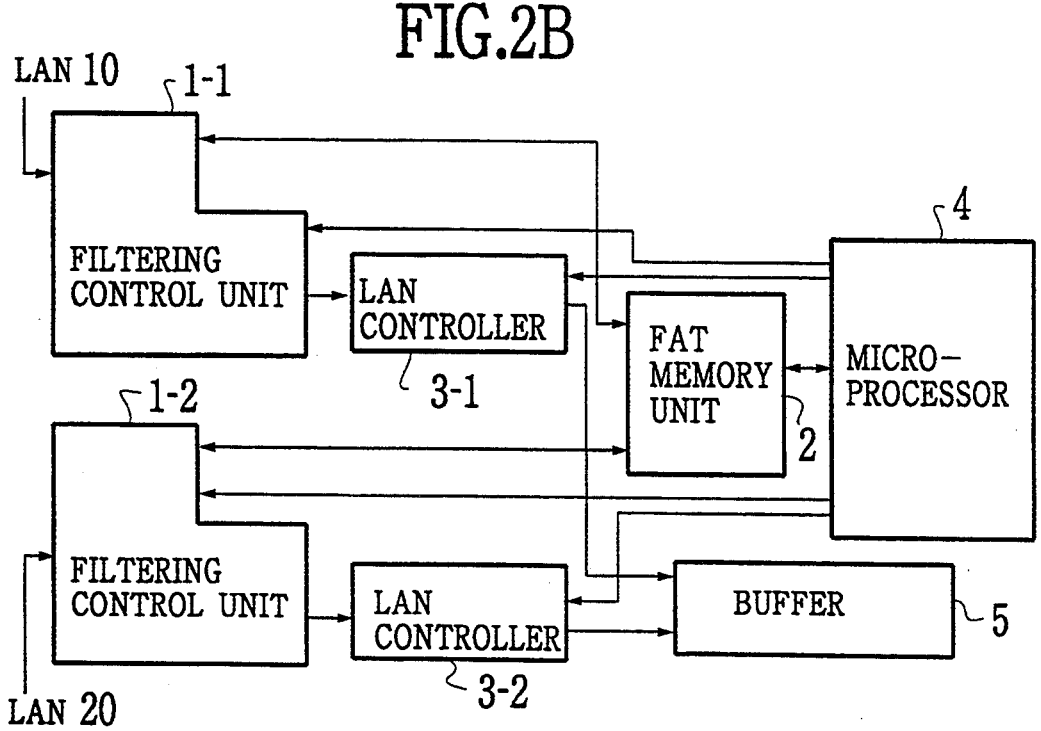

LOCAL AREA NETWORK BRIDGE APPARATUS WITH DEDICATED PACKET FILTERING MECHANISM

BACKGROUND OF THE INVENTION

1. Field of the Invention

The present invention relates to a local area network (LAN) bridge apparatus for interfacing a plurality of LANs by controlling packets transmissions among the LANs.

2. Description of the Background Art

As a conventional LAN bridge apparatus for interfacing a plurality of LANs, there has been a multi-access control (MAC) address learning type LAN bridge apparatus which carries out the packet filtering operation to receive all the packets transmitted from each LAN and discard those packets which are destined to the nodes of the same LAN as they are transmitted from, because the relaying of these packets to the other LANs is unnecessary and could lead to the deterioration of the transmission efficiency in the other LANs.

Conventionally, such a conventional LAN bridge apparatus has been realized in a form of a micro-processor operated by an appropriate control program to carry out the above described packet filtering operation.

More specifically, the micro-processor of such a conventional LAN bridge apparatus operates as follows.

First, the micro-processor controls the LAN controller to operate in the all receiving mode. Then, the micro-processor registers the sender addresses of the packets transmitted from each LAN in its memory, so as to carry out the address leaning operation to learn the addresses of the nodes belonging to each LAN. Then, the micro-processor carries out the packet filtering operation by comparing the destination address of each packet transmitted to the LAN controller with the sender addresses registered in its memory, and discarding those packets whose destination addresses coincide with the sender addresses registered in its memory, so as not to relay these packets to the other LANs.

Now, in such a conventional LAN bridge apparatus, the address learning operation to register the sender addresses as well as the packet filtering operation to judge the relaying or discarding of each packet are carried out entirely by the program execution on the micro-processor, so that the there is a possibility for the micro-processor to spend a considerable portion of its operation time for the processing of the address learning and the packet discarding rather than the packet relaying, especially when there are many communications within the same LAN. In such a case, the load on the micro-processor increases considerably, and for this reason, it has been difficult to improve the throughput of such a conventional LAN bridge apparatus as a whole even when the high speed micro-processor is employed.

SUMMARY OF THE INVENTION

It is therefore an object of the present invention to provide a LAN bridge apparatus capable of carrying out the address learning and the packet filtering at a high speed, without requiring the program execution on the micro-processor for these purposes, such that the load on the micro-processor can be reduced and the throughput of the LAN bridge apparatus as a whole can be improved.

According to one aspect of the present invention there is provided a local area network (LAN) bridge apparatus for interfacing at least two LANs, comprising: at least one filtering address table (FAT) memory means having a plurality of entries for registering FAT data, each FAT data containing a filtering address (FA); at least two filtering control units provided in correspondence to said at least two LANs, each filtering control unit including: FAT memory address generation means for generating FAT memory addresses for specifying the entries of the FAT memory means by compressing a sender address (SA) and a destination address (DA) of each packet transmitted from a corresponding one of said at least two LANs; address learning means for obtaining the SA of each packet transmitted from the corresponding one of said at least two LANs, and registering the FAT data with the obtained SA as the FA in one of the entries of the FAT memory means specified by the FAT memory address generated by the FAT memory address generation means from the SA of said each packet; DA obtaining means for obtaining a DA from each packet transmitted from the corresponding one of said at least two LANs; and judging means for judging a packet transmitted from the corresponding one of said at least two LANs as a packet to be discarded when the FA of the FAT data registered in one of the entries of the FAT memory means specified by the FAT memory address generated by the FAT memory address generation means from the DA of said packet coincides with the DA obtained by the DA obtaining means from said packet; at least two LAN controllers provided in correspondence to said at least two filtering control units, for discarding said packet judged as a packet to be discarded by the judging means of a corresponding one of said at least two filtering control units, and receiving a packet transmitted from the corresponding one of said at least two LANs which is not judged as a packet to be discarded by the judging means of the corresponding one of said at least two filtering control units; and a micro-processor for controlling each of said at least two LAN controllers to relay each packet received by each of said at least two LAN controllers to the LANs other than the corresponding one of said at least two LANs.

According to another aspect of the present invention there is provided a local area network (LAN) bridge apparatus for packet filtering packets transmitted from a LAN, comprising: filtering address table (FAT) memory means having a plurality of entries for registering FAT data, each FAT data containing a filtering address (FA); FAT memory address generation means for generating FAT memory addresses for specifying the entries of the FAT memory means by compressing a sender address (SA) and a destination address (DA) of each packet transmitted from the LAN; address learning means for obtaining the SA of each packet transmitted from the LAN, and registering the FAT data with the obtained SA as the FA in one of the entries of the FAT memory means specified by the FAT memory address generated by the FAT memory address generation means from the SA of said each packet; DA obtaining means for obtaining a DA from each packet transmitted from the LAN; judging means for judging a packet transmitted from the LAN as a packet to be discarded when the FA of the FAT data registered in one of the entries of the FAT memory means specified by the FAT memory address generated by the FAT memory address generation means from the DA of said packet coincides with the DA obtained by the DA obtaining means from said packet; a LAN controller for discarding said packet judged as a packet to be discarded by the judging means, and receiving a packet transmitted from the LAN which is not judged as a packet to be discarded by the judging means; and a micro-processor for controlling the LAN controller to relay each packet received by the LAN controller to another LAN.

According to another aspect of the present invention there is provided a local area network (LAN) bridge apparatus for stripping of packets transmitting in a ring type LAN, comprising: filtering address table (FAT) memory means having a plurality of entries for registering FAT data, each FAT data containing a filtering address (FA); FAT memory address generation means for generating FAT memory addresses for specifying the entries of the FAT memory means by compressing a sender address (SA) of each packet transmitting in the ring type LAN; address learning means for obtaining the SA of each packet transmitted into the ring type LAN, and registering the FAT data with the obtained SA as the FA in one of the entries of the FAT memory means specified by the FAT memory address generated by the FAT memory address generation means from the SA of said each packet; SA obtaining means for obtaining a SA from each packet transmitting in the ring type LAN; judging means for judging a packet transmitting in the ring type LAN as a packet to be stripped when the FA of the FAT data registered in one of the entries of the FAT memory means specified by the FAT memory address generated by the FAT memory address generation means from the SA of said packet coincides with the SA obtained by the SA obtaining means from said packet; and a LAN controller for stripping said packet judged as a packet to be stripped by the judging means.

Other features and advantages of the present invention will become apparent from the following description taken in conjunction with the accompanying drawings.

BRIEF DESCRIPTION OF THE DRAWINGS

FIGS. 2A and 2B are schematic block diagrams of two alternative general configurations for one embodiment of the LAN bridge apparatus according to the present invention.

DETAILED DESCRIPTION OF THE PREFERRED EMBODIMENTS

Now, one embodiment of the LAN bridge apparatus according to the present invention will be described in detail.

Figure 1:
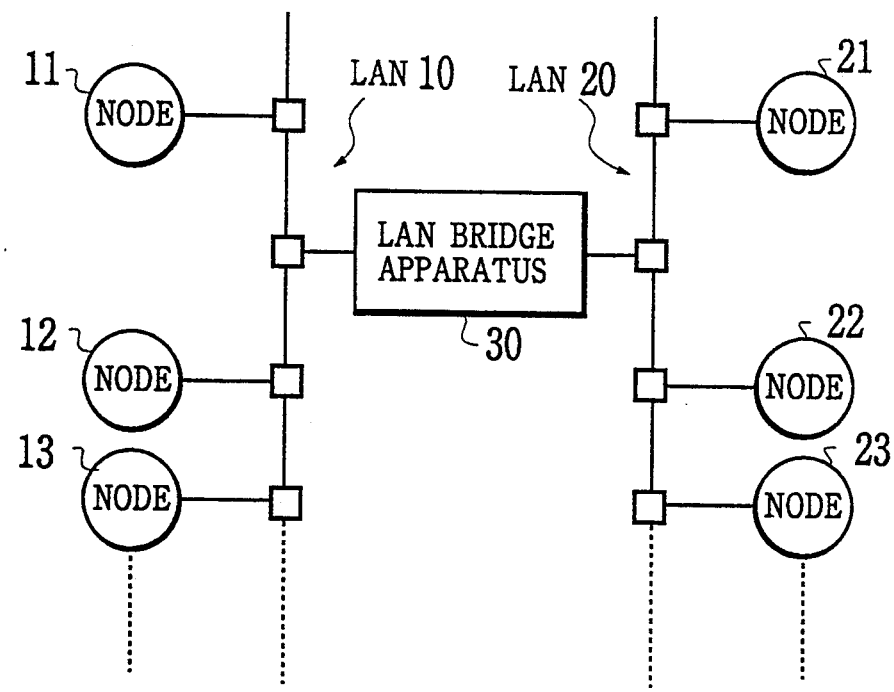
FIG. 1 is a schematic diagram of a typical situation in which the LAN bridge apparatus according to the present invention is employed.

First, it is to be noted that the LAN bridge apparatus according to the present invention is typically used in a situation as shown in FIG. 1, in which a bus type LAN 10 having nodes 11, 12, 13, etc., and a bus type LAN 20 having nodes 21, 22, 23, etc., are interfaced by the LAN bridge apparatus 30 connected therebetween, which relays the packets to be transmitted between a node of the LAN 10 and a node of the LAN 20, while discarding those packets to be transmitted among the nodes of either one of the LANs 10 and 20 themselves.

In further detail, the LAN bridge apparatus 30 can have a general configuration as shown in FIG. 2A, which comprises: filtering control units 1 (1-1, 1-2) provided in correspondence to the LANs 10 and 20, which will be described in detail below; FAT memory units 2 (2-1, 2-2) provided in correspondence to the filtering control units 1 (1-1, 1-2), which will also be described in detail below; LAN controllers 3 (3-1, 3-2) provided in correspondence to the filtering control units 1 (1-1, 1-2) for relaying or discarding the packets transmitted from each of the LANs 10 and 20 according to the corresponding filtering control units 1 (1-1, 1-2); a common micro-processor 4 for controlling the operation of the LAN bridge apparatus 30 as a whole; and a common buffer 5 for temporarily storing the packets received by the LAN controller 3 (3-1, 3-2).

Alternatively, the LAN bridge apparatus 30 can have a general configuration as shown in FIG. 2B, which comprises: filtering control units 1 (1-1, 1-2) provided in correspondence to the LANs 10 and 20 which will be described in detail below; a FAT memory unit 2 commonly provided for the filtering control units 1-1, 1-2 which will also be described in detail below; LAN controllers 3 (3-1, 3-2) provided in correspondence to the filtering control units 1 (1-1, 1-2) for relaying or discarding the packets transmitted from each of the LANs 10 and 20 according to the corresponding filtering control units 1 (1-1, 1-2); a common micro-processor 4 for controlling the operation of the LAN bridge apparatus 30 as a whole; and a common buffer 5 for temporarily storing the packets received by the LAN controller 3 (3-1, 3-2).

Figure 3:
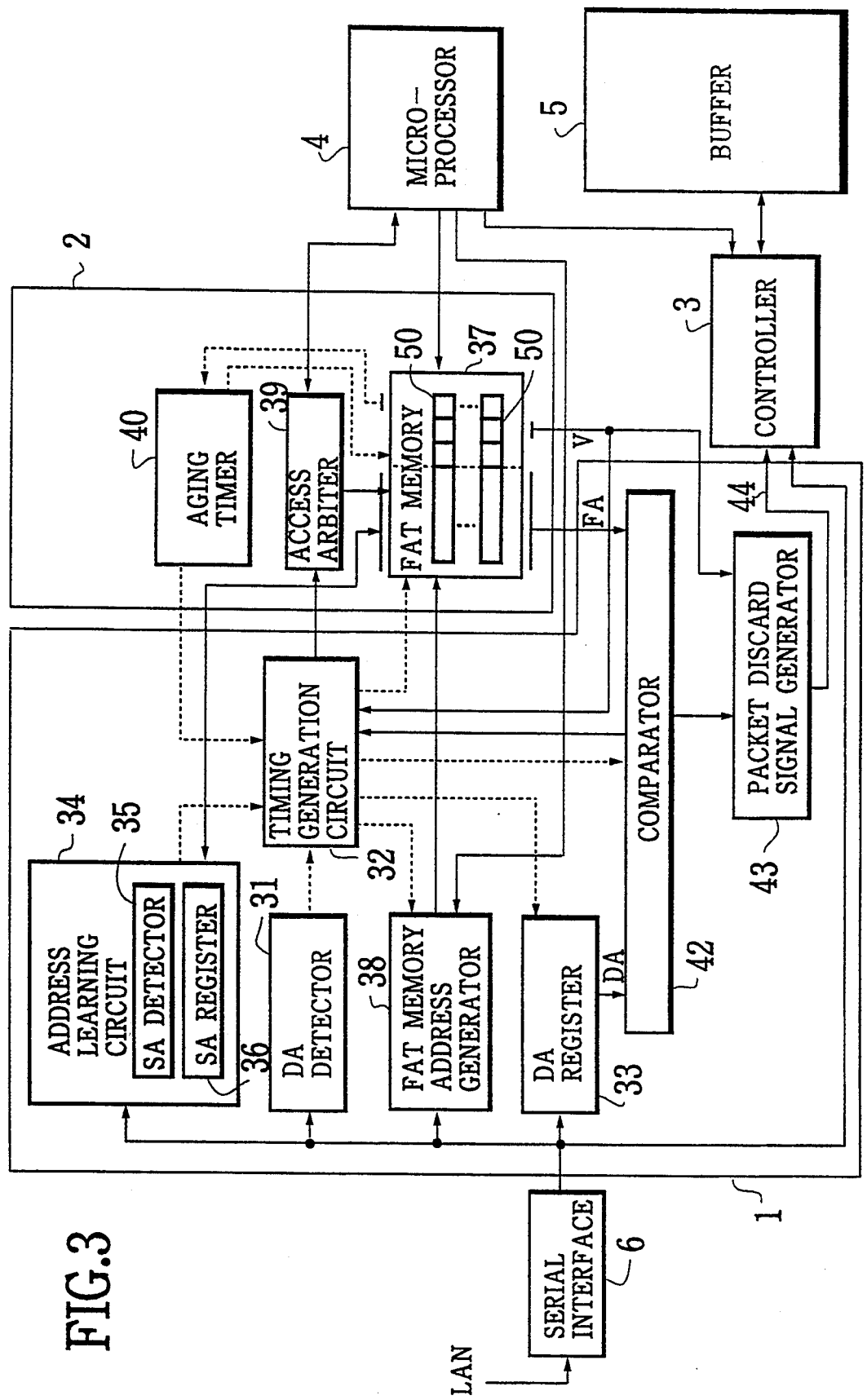
FIG. 3 is a detailed block diagram of an interface section associated with one LAN in one embodiment of the LAN bridge apparatus according to the present invention.

In either one of these general configurations of FIGS. 2A and 2B, the LAN bridge apparatus 30 provides an interface section with respect to each of the LANs 10 and 20 having a detailed configuration as shown in FIG. 3, formed by the filtering control unit 1, the FAT memory unit 2, the LAN controller 3, the micro-processor 4, and the buffer 5, of which at least the micro-processor 4 and the buffer 5 are shared by all the interface sections involved in the LAN bridge apparatus 30.

More specifically, the filtering control unit 1 has: a destination address (DA) detector 31 for counting bits of 48 bits DA contained in each packet transmitted from the LAN and serially entered by a serial interface 6 to detect a timing at which the entire 48 bits DA is entered; a timing generation circuit 32 for generating various timing signals for the read access control used at various elements in this interface section of FIG. 3; and a DA register 33 formed by a 48 bits shift register for storing the DA contained in the packet transmitted from the LAN and serially entered by the serial interface 6. Here the timing generation circuit 32 also functions to carry out the write access control to be described in detail below.

In addition, the filtering control unit 1 also has an address learning circuit 34 for obtaining a sender address (SA) of each packet transmitted from the LAN and serially entered by the serial interface 6, which is to be learned as a filtering address (FA) to be used in the packet filtering operation, where the address learning circuit 34 includes an SA detection circuit 35 for detecting a 48 bits SA portion of each packet transmitted from the LAN which is provided immediately after the DA in each packet, and an SA register 36 formed by a 48 bits shift register for storing the SA contained in the packet transmitted from the LAN and serially entered by the serial interface 6 in accordance with the SA portion detected by the SA detection circuit 35.

On the other hand, the FAT memory unit 2 has a FAT (filtering address table) memory 37 having a plurality of entries for registering FAT data 50, where each FAT data 50 containing the SA obtained by the address learning unit 34 as the FA.

Figure 4A:
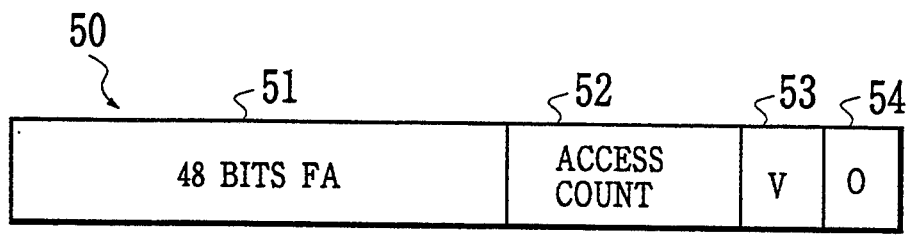
FIGS. 4a and 4B are diagrams indicating the formats of the FAT data used in one embodiment of the LAN bridge apparatus according to the present invention, in cases of adopting the general configurations of FIGS. 2A and 2B, respectively.

Here, when the general configuration of FIG. 2A is adopted, each FAT data 50 in each entry of the FAT memory 37 is given in a format shown in FIG. 4A which includes: a 48 bits FA 51 representing the SA obtained by the address learning circuit 34 during the address learning operation; an access count 52 indicating a period during which the packet with the SA identical to the FA 51 of each FAT data 50 has not been transmitted from the LAN; a V bit 53 indicating whether each FAT data 50 is valid or not, which is to be set to "1" (an on state) in a case the FAT data 50 is valid and to "0" (an off state) otherwise; and an O bit 54 indicating whether each FAT data 50 is allocated to more than one nodes in overlap or not, which is to be set to "1" (an on state) in a case the FAT data 50 is allocated to more than one nodes in overlap and to "0" (an off state) otherwise. When the general configuration of FIG. 2B is adopted, each FAT data 50 further includes a LAN port number 55 for identifying the LAN from which the packet has been transmitted.

In conjunction with this FAT memory 37 of the FAT memory unit 2, the filtering control unit 1 further includes a FAT memory address generation circuit 38 for generating the address of each entry in the FAT memory 37 by sequentially compressing the 48 bits SA or DA contained in the packets transmitted from the LAN and serially entered by the serial interface 6. In this embodiment, the FAT memory address generation circuit 38 is formed by a CC (Cyclic Redundancy Check) circuit which divides the 48 bits SA or DA by the compression data called generator polynomial which is specified from the micro-processor 4 and indicating the CRC circuit parameters, and outputs 8 to 16 bits residue called CRC codes as the compressed FAT memory address.

The FAT memory unit 2 further includes: an address arbiter 39 for arbitrating the FAT memory access request from the timing generation circuit 32 and the micro-processor 4; and an aging timer 40 for checking the entries in the FAT memory 37 with the V bit 53 in the on state at a regular time interval, incrementing the access count 52 of these valid entries, and controlling the timing generation circuit 32 to invalidate those entries in the FAT memory 37 which have the V bit 53 in the on state and the access count 52 over a prescribed threshold by changing the V bit 53 into the off state, so as to eliminate the FAT data 50 corresponding to the packet with the SA coinciding with the registered FA 51 which has not been transmitted from the LAN for a prescribed period of time.

The filtering control unit 1 further includes: a comparator 42 for comparing the DA stored in the DA register 33 with the FA 51 of the FAT data 50 read out from the FAT memory 37 according to the FAT memory address generated by the FAT memory address generation circuit 38 from the DA, in order to determine whether the DA of the received packet coincides with the learned FA; and a packet discard signal generator 43 for generating a packet discard signal 44 to command the discarding of the received packet to the LAN controller 3 when the comparison result outputted from the comparator 42 indicates that the DA of the transmitted packet coincides with the learned FA and the V bit 53 of the FAT data 50 read out from the FAT memory 37 according to the FAT memory address generated by the FAT memory address generation circuit 38 from the DA is in the on state.

The LAN controller 3 is of a usual type capable of carrying out the relaying or discarding the packets transmitted from the LAN according to the packet discard signal 44 from the packet discard signal generator 43, which also has usual functions such as a serial/parallel conversion function.

Now, the operation of each interface section of this LAN bridge apparatus as shown in FIG. 3 will be described in detail.

First, at an initialization stage, the micro-processor 4 sets the FAT memory 37 in an initial state in which all the entries of the FAT memory 37 are invalidated by setting the V bit 53 of every entry of the FAT memory 27 in the off state.

Then, the micro-processor 4 controls the LAN controller 3 to operate in the all receiving mode, such that all the packets transmitted from the LAN 10 and serially entered by the serial interface 6 to the LAN controller 3 are received by the LAN controller 3 at the beginning. The packets received at the LAN controller 3 are temporarily stored in the buffer 5, and then relayed to the LAN 20 through the LAN controller 3 provided on the interface section associated with the LAN 20 side.

On the other hand, the address learning circuit 34 sequentially obtains the SA of each of the packets transmitted from the LAN 10 and serially entered by the serial interface 6 by using the SA detection circuit 35 and the SA register 36, while the FAT memory address generator 38 sequentially generates the the FAT memory address by compressing the 48 bits SA of each of the packets transmitted from the LAN 10 and serially entered by the serial interface 6 by using the generator polynomial specified by the micro-processor 4 as the compression data. Here, the FAT memory address can be obtained by the FAT memory address generator 38 as soon as the entire 48 bits SA is serially entered.

Figure 4B:
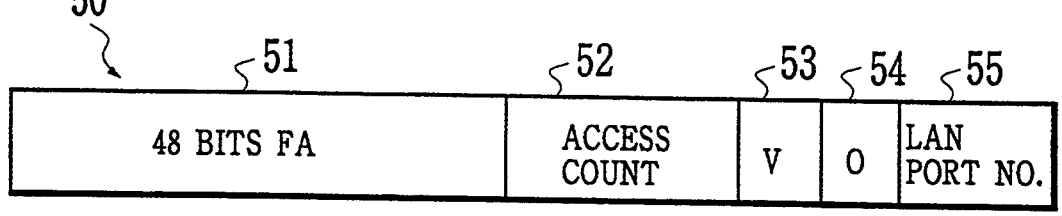

Then, the SA obtained by the address learning circuit 34 is registered into an entry in the FAT memory 37 specified by the FAT memory address obtained by the FAT memory address generator 38 from the SA, as the FA 51 of the FAT data 50 in that specified entry. Here, the access count 52 of each newly registered FAT data 50 is set to zero, while the V bit 53 of each newly registered FAT data 50 is set in the on state ("1"). Also, the address learning circuit 34 reads out the entry of the FAT memory 37 specified by the FAT memory address obtained by the FAT memory address generator 38 from the SA first, and when that specified entry already has the FAT data 50 with the V bit 53 in the on state but the FA 51 different from the SA to be registered from the address learning circuit 34, the 0 bit 54 of that FAT data 50 is set in the on state ("1") while overwriting the already existing FA 51 by the SA obtained at the address learning circuit 34. Also, in a case the FAT data 50 is in a format of FIG. 4B, the LAN port number 55 of that entry is automatically set to indicate the LAN to which this filtering control unit 1 is connected.

In this manner, the address learning circuit 34 carries out the address learning operation to learn the FA 51 for the FAT data 50 registered in the FAT memory 37. As this address learning by the address learning circuit 34 is continued, the filtering control unit 1 starts to output the packet discard signal 44 to the LAN controller 3 for those packets which have the DA coinciding with the FA 51 of the registered FAT data 50, such that these packets will not be received at the LAN controller 3 and the increasing number of the packets transmitted from the LAN will be discarded by the packet filtering operation at the LAN controller 3 as this address learning operation goes on, in the following manner.

Namely, in the packet filtering operation, the packet transmitted from the LAN and serially entered by the serial interface 6 is lead to the DA detector 31, the DA register 33, the FAT memory address generator 38, and the LAN controller 3. At the DA detector 31, the 48 bits of the DA of each packet is counted and the detection of the DA is notified to the timing generation circuit 32 when the 48 bits are counted up. In response, the timing generation circuit 32 generates the timing for the address generation start timing at the FAT memory address generator 38, the shift stop timing at the DA register 33, the memory access timing at the FAT memory 37, and the comparison operation timing at the comparator 42.

The FAT memory address generator 38 sequentially generates the the FAT memory address as the 8 to 16 bits CRC codes by compressing the 48 bits DA of each packet transmitted from the LAN and serially entered by the serial interface 6 by using the generator polynomial specified by the micro-processor 4 as the compression data, starting at the address generation start timing specified from the timing generation circuit 32. Here, again, the FAT memory address can be obtained by the FAT memory address generator 38 as soon as the entire 48 bits DA is serially entered.

On the other hand, the DA register 33 continues its shifting operation with respect to each packet transmitted from the LAN and serially entered by the serial interface 6, until the shifting stop timing specified from the timing generation circuit 32, so as to store the 48 bits DA provided by the first 48 bits of each packet.

Next, the FAT memory address generated by the FAT memory address generator 38 from the DA is supplied to the FAT memory 37, and the entry specified by this FAT memory address is accessed at the memory access timing specified from the timing generation circuit 32 to read out the FAT data 50 registered in that specified entry.

The FA 51 of the FAT data 50 read out from the FAT memory 37 is then supplied to the comparator 42 along with the DA stored in the DA register 33. The comparator 42 then compares the FA 51 supplied from the FAT memory 37 and the DA supplied from the DA register 33 at the comparison operation timing specified from the timing generation circuit 32 and outputs the comparison result Indicating coincidence or non-coincidence of the compared FA 51 and DA to the packet discard signal generator 43.

At the same time, the V bit 53 and the LAN port number 55 (if it is used) of the FAT data 50 read out from the FAT memory 37 are also supplied to the packet discard signal generator 43, and the packet discard signal generator 43 outputs the packet discard signal 44 for commanding the LAN controller 3 to discard the transmitted packet whenever the comparison result from the comparator 42 indicates the coincidence of the compared FA 51 and DA and the V bit 53 from the FAT memory 37 is in the on state indicating the read out FAT data 50 as valid.

Meanwhile, the timing generation circuit 32 also receives the V bit 53 and the LAN port number 55 of the read out FAT data 50 and the comparison result outputted from the comparator 42, and carries out the following wrlte access control with respect to the FAT memory 37.

Namely, when the V bit 53 from the FAT memory 37 is in the on state indicating the read out FAT data 50 as valid, and the SA obtained at the address learning circuit 34 coincides with the FA 51 of the already registered FAT data 50 in the FAT memory 37, the access count 52 of that FAT data 50 in the FAT memory 37 is reset to zero in order to indicate the recent occurrence of the transmission of the packet with that SA in that FAT data 50, so as to prevent the erroneous invalidation of that valid FAT data 50 due to the aging timer 40.

On the other hand, when the comparison result from the comparator 42 indicates the non-coincidence of the compared FA 51 and DA, while the V bit 53 from the FAT memory 37 is in the on state and the LAN port number 55 from the FAT memory 37 coincides with the LAN port number of the LAN to which this filtering control unit 1 is connected, it implies that the entry of the FAT memory specified by the generated FAT memory address has allocated in overlap to the node specified by the FA 51 of the read out FAT data 50 as well as to some other node. This situation occurs very rarely, but its occurrence can be attributed to the inappropriateness of the compression data used at the FAT memory address generator 38, so that the timing generation circuit 32 sets the 0 bit 54 of the read out FAT data 50 in the FAT memory 37 to the on state ("1") in order to inform the micro-processor 4 about occurrence of the situation indicative of the inappropriateness of the compression data.

Now, the aging timer 40 checks the entries of the FAT memory 37 with the V bit 53 in the on state at a regular time interval, and increments the value of the access count 52 of the FAT data 50 registered in these valid entries. Then, the aging timer 40 controls the timing generation circuit 32 to invalidate those valid entries of the FAT memory 37 with the value of the access count 52 over the prescribed threshold by changing the V bit 53 of these entries into the off state. In this manner, those entries of the FAT memory 37 corresponding to the packets having the registered FA 51 as the SA which have not been transmitted from the LAN 10 for a prescribed period of time will be eliminated from the FAT memory 37, so as to improve the utilization efficiency of the FAT memory 37.

Also, the micro-processor 4 regularly checks the entries of the FAT memory 37 with the 0 bit 54 in the on state. When a number or a rate of those entries with the 0 bit 54 in the on state exceeds a prescribed threshold indicating the tolerable number or rate of the entries allocated to more than one nodes in overlap, the micro-processor judges that the compression data specified to the FAT memory address generator 38 has been inappropriate, and invalidate all the entries of the FAT memory 37 once, while changing the compression data to be specified to the FAT memory address generator 38 appropriately.

When the request for the access to the FAT memory 37 from the micro-processor 4 occurs simultaneously with the request for the access to the FAT memory 37 from the timing generation circuit 32, the access arbiter 39 arbitrates the competing access requests by giving the priority to the access request from the timing generation circuit 32 over the access request from the micro-processor 4.

In a case of adopting the general configuration of FIG. 2B using the common FAT memory unit 2 shared by more than one filtering control units 1, the LAN port number 55 of the FAT data 50 read out from the FAT memory 37 is compared with the LAN port number of the LAN connected with each filtering control unit 1 at the comparator 42 and the packet discard signal generator 43 generates the packet discard signal 44 only when the comparison result from the comparator 42 indicates the coincidence of the compared FA 51 and DA and the coincidence of the LAN port numbers. In this manner, the FAT memory unit 2 can be shared among a plurality of the filtering control unit 1 so that the cost of the LAN bridge apparatus can be reduced.

In addition, when more than two LANs are interfaced by the LAN bridge apparatus with this type of the general configuration in which more than two filtering control units 1 shares the common FAT memory unit 2, the LAN port number 55 of the FAT data 50 in the FAT memory 37 can be utilized by the micro-processor 4 to determine the LAN to which the packet to be received by the LAN controller 3 is to be relayed. Namely, when the comparison result from the comparator 42 indicates the coincidence of the compared FA 51 and DA and the non-coincidence of the LAN port numbers, this packet must be received by the LAN controller 3 and relayed to the other LAN, and this other LAN to which this packet must be relayed to is indicated by the LAN port number 55 of the FAT data 50 in the FAT memory 37 whose FA 51 coincides with the DA of this packet, so that the micro-processor 4 can appropriately control the LAN controllers 3 according to this LAN port number 55 of the FAT data 50 in the FAT memory 37.

As described, according to this first embodiment, the address learning as well as the packet discard signal generation are carried out by the filtering control unit 1 and the FAT memory unit 2 alone, and therefore the micro-processor 4 can be relieved from the program execution for the purposes of the address learning operation and the packet discarding operation. As a consequence, the load on the micro-processor 4 can be reduced considerably and the micro-processor 4 can be used more efficiently for its primary functions such as that of the packet relaying operation, so that the throughput of the LAN bridge apparatus as a whole can be improved significantly.

It is to be note that the FAT memory address generator 38 in a form of the CRC circuit using the generator polynomial as the compression data as described above may be replaced by any other known address compression circuit using any suitable compression data.

It is also to be noted that the LAN bridge apparatus as described above is also applicable to the ring type LANs as well as to a combination of the bus type LAN and the ring type LAN, similarly to the case of interfacing the bus type LANs as shown in FIG. 1.

In addition, the LAN bridge apparatus as described above can be utilized for a so called transparent bridge in the ring type LANs for carrying out the stripping function to strip off those packets which are transmitted into the ring type LAN and circulated through that ring type LAN once around. In this case, the DA detector 31 and the DA register 33 used in the embodiment described above are replaced by an SA detector and the SA register for obtaining the SA from each packet transmitting in the ring type LAN, while the address learning circuit 34 obtains the SA of each packet transmitted into the ring type LAN, and registering the FAT data with the obtained SA as the FA 51 in one of the entries of the FAT memory 37 specified by the FAT memory address generated by the FAT memory address generator 38 from the SA of that each packet. Then, the comparator 42 compares the FA 51 of the FAT data 50 registered in one of the entries of the FAT memory 37 specified by the FAT memory address generated by the FAT memory address generator 38 from the SA of each packet with the SA obtained by the SA detector and the SA register from that each packet. As a result, the packet discard signal generated by the packet discard signal generator 43 effectively functions as a packet stripping signal for commanding the stripping of the packet to the LAN controller 3.

It is further to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A local area network (LAN) bridge apparatus for interfacing at least two LANs, comprising:
   at least one filtering address table (FAT) memory means having a plurality of entries for registering FAT data, each FAT data containing a filtering address (FA);
   at least two filtering control units provided in correspondence to said at least two LANs, each filtering control unit including
   FAT memory address generation means for generating FAT memory addresses for specifying the entries of the FAT memory means by compressing one of a sender address (SA) and a destination address (DA) of each packet transmitted from a corresponding one of said at least two LANs;
   address learning means for obtaining the SA of each packet transmitted from the corresponding one of said at least two LANs, and registering the FAT data with the obtained SA as the FA In one of the entries of the FAT memory means specified by the FAT memory address generated by the FAT memory address generation means from the SA of said each packet;
   DA obtaining means for obtaining a DA from each packet transmitted from the corresponding one of said at least two LANs; and
   judging means for judging a packet transmitted from the corresponding one of said at least two LANs as a packet to be discarded when the FA of the FAT data registered in one of the entries of the FAT memory means specified by the FAT memory address generated by the FAT memory address generation means from the DA of said packet coincides with the DA obtained by the DA obtaining means from said packet;

at least two LAN controllers provided in correspondence to said at least two filtering control units, for discarding said packet judged as a packet to be discarded by the judging means of a corresponding one of said at least two filtering control units, and receiving a packet transmitted from the corresponding one of said at least two LANs which is not judged as a packet to be discarded by the judging means of the corresponding one of said at least two filtering control units; and a micro-processor for controlling each of said at least two LAN controllers to relay each packet received by each of said at least two LAN controllers to the LANs other than the corresponding one of said at least two LANs;

wherein the FAT memory address generation means comprises a cyclic redundant check (CRC) circuit and the micro-processor specifies compression data used at the FAT memory address generation means in compressing one of the SA and the DA of each packet transmitted from the corresponding one of said at least two LANs in a form of a generator polynomial.

2. The apparatus of claim 1, wherein said at least one FAT memory means comprises at least two FAT memory means provided in correspondence to said at least two filtering control units.

3. The apparatus of claim 1, wherein said at least one FAT memory means comprises only one FAT memory means shared by said at least two filtering control units.

4. The apparatus of claim 3, wherein each FAT data further contains a LAN port number specifying one of said at least two LANs from which a packet with the SA coinciding with the FA of said each FAT data is transmitted.

5. The apparatus of claim 4, wherein the judging means judges a packet transmitted from the corresponding one of said at least two LANs as a packet to be discarded when the FA of the FAT data registered in one of the entries of the FAT memory means specified by the FAT memory address generated by the FAT memory address generation means from the DA of said packet coincides with the DA obtained by the DA obtaining means for said packet, and the LAN port number of the FAT data registered in one of the entries of the FAT memory means specified by the FAT memory address generated by the FAT memory address generation means from the DA of said packet coincides with the LAN port number for specifying the corresponding one of said at least two LANs.

6. The apparatus of claim 4, wherein the microprocessor controls each of said at least two LAN controllers to relay each packet received by each of said at least two LAN controllers to one of said at least two LANs specified by the LAN port number of the FAT data registered in one of the entries of the FAT memory means specified by the FAT memory address generated by the FAT memory address generation means from the DA of said each packet.

7. The apparatus of claim 1, wherein each FAT data further contains a V bit indicating a validity of said each FAT data.

8. The apparatus of claim 7, wherein the judging means judges a packet transmitted from the corresponding one of said at least two LANs as a packet to be discarded when the FA of the FAT data registered in one of the entries of the FAT memory means specified by the FAT memory address generated by the FAT memory address generation means from the DA of said packet coincides with the DA obtained by the DA obtaining means from said packet, and the V bit of the FAT data registered in one of the entries of the FAT memory means specified by the FAT memory address generated by the FAT memory address generation means from the DA of said packet indicates that FAT data as valid.

9. The apparatus of claim 7, wherein each FAT data further contains an 0 bit indicating an occurrence of overlapping allocations of said each FAT data to two different nodes of said at least two LANs.

10. The apparatus of claim 9, wherein the judging means also sets the 0 bit of the FAT data registered in one of the entries of the FAT memory means specified by the FAT memory address generated by the FAT memory address generation means from the DA of a packet to indicate the occurrence of overlapping allocations, when the FA of the FAT data registered in one of the entries of the FAT memory means specified by the FAT memory address generated by the FAT memory address generation means from the DA from said packet does not coincide with the DA obtained by the DA obtaining means from said packet and the V bit of the FAT data registered in one of the entries of the FAT memory means specified by the FAT memory address generated by the FAT memory address generation means from the DA of said packet indicates that FAT data as valid.

11. The apparatus of claim 9, wherein the microprocessor means invalidates all the entries of the FAT memory means when a number of the FAT data with the 0 bit indicating the occurrence of overlapping allocations in the FAT memory means exceeds a prescribed threshold.

12. The apparatus of claim 9, wherein the microprocessor specifies compression data used at the FAT memory address generation means in compressing the SA and the DA of each packet transmitted from the corresponding one of said at least two LANs, and changes the compression data to be specified when a number of the FAT data with the 0 bit indicating the occurrence of overlapping allocations in the FAT memory means exceeds a prescribed threshold.

13. The apparatus of claim 1, wherein each FAT data further contains an access count value indicating a period of time during which a packet with the SA coinciding with the FA of said each FAT data has not been transmitted from the corresponding one of said at least two LANs.

14. The apparatus of claim 13, wherein the FAT memory means invalidates the FAT data with the access count value exceeding a prescribed threshold.

15. The apparatus of claim 1, wherein the FAT memory address generation means generates the FAT memory addresses as CRC codes.

16. The apparatus of claim 1, further comprising a buffer for temporarily storing each packet received by each of said at least two LAN controllers before said each packet is relayed to the LANs other than the corresponding one of said at least two LANs.

17. A local area network (LAN) bridge apparatus for packet filtering packets transmitted from a LAN, comprising:

filtering address table (FAT) memory means having a plurality of entries for registering FAT data, each FAT data containing a filtering address (FA);

FAT memory address generation means for generating FAT memory addresses for specifying the entries of the FAT memory means by compressing one of a sender address (SA) and a destination address (DA) of each packet transmitted from the LAN;

address learning means for obtaining the SA of each packet transmitted from the LAN, and registering the FAT data with the obtained SA as the FA In one of the entries of the FAT memory means specified by the FAT memory address generated by the FAT memory address generation means from the SA of said each packet;

DA obtaining means for obtaining a DA from each packet transmitted from the LAN;

judging means for judging a packet transmitted from the LAN as a packet to be discarded when the FA of the FAT data registered in one of the entries of the FAT memory means specified by the FAT memory address generated by the FAT memory address generation means from the DA of said packet coincides with the DA obtained by the DA obtaining means from said packet;

a LAN controller for discarding said packet judged as a packet to be discarded by the judging means, and receiving a packet transmitted from the LAN which is not judged as a packet to be discarded by the judging means; and a micro-processor for controlling the LAN controller to relay each packet received by the LAN controller to another LAN;

wherein the FAT memory address generation means comprises a cyclic redundant check (CRC) circuit and the micro-processor specifies compression data used at the FAT memory address generation means in compressing one of the SA and the DA of each packet transmitted from the corresponding one of said at least two LANs in a form of a generator-polynomial.

18. A local area network (LAN) bridge apparatus for stripping of packets transmitting in a ring type LAN, comprising:

filtering address table (FAT) memory means having a plurality of entries for registering FAT data, each FAT data containing a filtering address (FA);

FAT memory address generation means for generating FAT memory addresses for specifying the entries of the FAT memory means by compressing a sender address (SA) of each packet transmitting in the ring type LAN;

address learning means for obtaining the SA of each packet transmitted into the ring type LAN, and registering the FAT data with the obtained SA as the FA in one of the entries of the FAT memory means specified by the FAT memory address generated by the FAT memory address generation means from the SA of said each packet;

SA obtaining means for obtaining a SA from each packet transmitting in the ring type LAN;

judging means for judging a packet transmitting in the ring type LAN as a packet to be stripped when the FA of the FAT data registered in one of the entries of the FAT memory means specified by the FAT memory address generated by the FAT memory address generation means from the SA of said packet coincides with the SA obtained by the SA obtaining means from said packet;

a LAN controller for stripping said packet judged as a packet to be stripped by the judging means; and a micro-processor for controlling the LAN controller to relay each packet received by the LAN controller;

wherein the FAT memory address generation means comprises a cyclic redundant check (CRC) circuit and the micro-processor specifies compression data used at the FAT memory address generation means in compressing the SA of each packet transmitted from the corresponding one of said at least two LANs in a form of a generator polynomial.

19. A local area network (LAN) bridge apparatus for interfacing at least two LANs, comprising:

at least one filtering address table (FAT) memory means having a plurality of entries for registering FAT data, each FAT data containing a filtering address (FA); at least two filtering control units provided in correspondence to said at least two LANs, each filtering control unit including:

FAT memory address generation means for generating FAT memory addresses for specifying the entries of the FAT memory means by compressing one of a sender address (SA) and a destination address (DA) of each Packet transmitted from a corresponding one of said at least two LANs;

address learning means for obtaining the SA of each packet transmitted from the corresponding one of said at least two LANs, and registering the FAT data with the obtained SA as the FA in one of the entries of the FAT memory means specified by the FAT memory address generated by the FAT memory address generation means from the SA of said each packet;

DA obtaining means for obtaining a DA from each packet transmitted from the corresponding one of said at least two LANs; and judging means for judging a packet transmitted from the corresponding one of said at least two LANs as a packet to be discarded when the FA of the FAT data registered in one of the entries of the FAT memory means specified by the FAT memory address generated by the FAT memory address generation means from the DA of said packet coincides with the DA obtained by the DA obtaining means from said packet;

at least two LAN controllers provided in correspondence to said at least two filtering control units, for discarding said packet judged as a packet to be discarded by the judging means of a corresponding one of said at least two filtering control units, and receiving a packet transmitted from the corresponding one of said at least two LANs which is not judged as a packet to be discarded by the judging means of the corresponding one of said at least two filtering control units; and a micro-processor for controlling each of said at least two LAN controllers to relay each packet received by each of said at least two LAN controllers to the LANs other than the corresponding one of said at least two LANs;

wherein said at least one FAT memory means comprises only one FAT memory means shared by said at least two filtering control units.

* * * * *